United States Patent
Grammel et al.

(10) Patent No.: US 10,469,921 B2
(45) Date of Patent: Nov. 5, 2019

(54) DATA CENTER PACKET OPTICAL TRANSPORT FAILURE PROTECTION

(71) Applicant: Juniper Networks, Inc., Sunnyvale, CA (US)

(72) Inventors: Gert Grammel, Ditzingen (DE); Antoni B Przygienda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/923,713

(22) Filed: Mar. 16, 2018

(65) Prior Publication Data

US 2019/0149896 A1 May 16, 2019

Related U.S. Application Data

(60) Provisional application No. 62/584,484, filed on Nov. 10, 2017.

(51) Int. Cl.
*H04B 10/00* (2013.01)
*H04Q 11/00* (2006.01)
(Continued)

(52) U.S. Cl.
CPC ........ *H04Q 11/0003* (2013.01); *H04J 14/021* (2013.01); *H04J 14/0269* (2013.01);
(Continued)

(58) Field of Classification Search
CPC ........... H04Q 11/0003; H04Q 11/0005; H04Q 11/0062; H04Q 2011/0056;
(Continued)

(56) References Cited

U.S. PATENT DOCUMENTS 7,369,769 B2 * 5/2008 Yang ................ H04J 14/0283
370/216
8,145,054 B2 * 3/2012 Ye ...................... H04B 10/077
398/19

(Continued)

OTHER PUBLICATIONS

Przygienda et al. "RIFT: Routing in Fat Trees draft-przygienda-rift-03" Networking Working Group, Internet-Draft, Oct. 28, 2017, 52 pp.

(Continued)

*Primary Examiner* — Hibret A Woldekidan
(74) *Attorney, Agent, or Firm* — Shumaker & Sieffert, P.A.

(57) ABSTRACT

In response to a connectivity disruption in an underlying optical transport ring supporting a routing and packet switching topology, one or more of optical devices of the optical transport ring are modified to establish connectivity between spine nodes in different data centers to reroute communication between at least a subset of the leaf network devices so as to traverse an inter-spine route via the optical modified optical transport ring. That is, in response to a connectivity disruption in a portion of underlying optical transport ring, one or more optical devices within the optical transport ring are modified such that packets between at least a portion of the leaf devices are rerouted along optical paths between at least two of the spine network devices.

20 Claims, 6 Drawing Sheets

(51) Int. Cl.
*H04L 12/707* (2013.01)
*H04L 12/703* (2013.01)
*H04L 12/24* (2006.01)
*H04J 14/02* (2006.01)

(52) U.S. Cl.
CPC ...... *H04J 14/0272* (2013.01); *H04J 14/0295* (2013.01); *H04L 41/0654* (2013.01); *H04L 41/0816* (2013.01); *H04L 45/22* (2013.01); *H04L 45/28* (2013.01); *H04Q 11/0005* (2013.01); *H04Q 11/0062* (2013.01); *H04Q 2011/0056* (2013.01); *H04Q 2011/0073* (2013.01); *H04Q 2011/0081* (2013.01); *H04Q 2011/0086* (2013.01); *H04Q 2011/0092* (2013.01)

(58) Field of Classification Search
CPC ... H04Q 2011/0073; H04Q 2011/0081; H04Q 2011/0086; H04Q 2011/0092; H04Q 2011/0096; H04Q 2011/0094; H04L 45/22; H04L 45/28; H04L 49/25; H04J 14/0283; H04J 14/0295; H04J 14/0294; H04J 14/0297; H04J 14/0291; H04J 14/02; H04J 14/0275; H04B 10/275; H04B 10/032; H04B 10/2755; H04B 10/0771; H04B 10/038
USPC .......................................... 398/2, 3, 4, 5, 59
See application file for complete search history.

(56) References Cited

U.S. PATENT DOCUMENTS

| | | | | | |
|---|---|---|---|---|---|
| 8,175,458 | B2* | 5/2012 | Way | ................... | H04J 14/0204 398/68 |
| 8,200,088 | B2* | 6/2012 | Sone | .................. | H04L 12/2852 398/66 |
| 8,270,830 | B2* | 9/2012 | Kirkpatrick | ........ | H04Q 11/0005 385/17 |
| 8,768,162 | B2* | 7/2014 | Zheng | ................. | H04B 10/032 398/3 |
| 8,934,771 | B2* | 1/2015 | Smolorz | ............ | H04Q 11/0067 398/58 |
| 9,020,346 | B2* | 4/2015 | Bhoja | .................. | H04B 10/541 398/45 |
| 9,369,785 | B1 | 6/2016 | Schmidtke et al. | | |
| 9,544,185 | B1* | 1/2017 | Yadav | ................. | H04L 41/0668 |
| 9,602,434 | B1* | 3/2017 | Saleh | ....................... | H04L 49/25 |
| 9,705,630 | B2* | 7/2017 | Liboiron-Ladouceur | | .................... H04J 14/04 |
| 9,753,805 | B2* | 9/2017 | Grammel | ............ | H04L 41/0668 |
| 9,967,231 | B2* | 5/2018 | Shetty | ................. | H04L 12/4633 |
| 10,038,946 | B2* | 7/2018 | Smolorz | ........... | H04Q 11/0067 |
| 10,200,278 | B2* | 2/2019 | Appanna | ............... | H04L 45/245 |
| 10,277,466 | B2* | 4/2019 | Manickam | .......... | H04L 41/0893 |
| 2003/0067643 | A1* | 4/2003 | Lee | ...................... | H04J 14/0206 398/42 |
| 2003/0169470 | A1* | 9/2003 | Alagar | ................ | H04J 14/0227 398/5 |
| 2005/0088964 | A1* | 4/2005 | Yang | ................... | H04J 14/0283 370/216 |
| 2006/0045519 | A1* | 3/2006 | Oren | ................... | H04B 10/275 398/4 |
| 2009/0169200 | A1* | 7/2009 | Li | ....................... | H04J 14/0282 398/7 |
| 2009/0252492 | A1* | 10/2009 | Sone | ................... | H04L 12/2852 398/49 |
| 2010/0020806 | A1* | 1/2010 | Vahdat | .................... | H04L 45/00 370/395.31 |
| 2010/0254703 | A1* | 10/2010 | Kirkpatrick | ........ | H04Q 11/0005 398/45 |
| 2013/0156425 | A1* | 6/2013 | Kirkpatrick | .......... | H04B 10/801 398/45 |
| 2014/0270762 | A1* | 9/2014 | Li | ........................... | H04L 45/02 398/45 |
| 2015/0078746 | A1* | 3/2015 | Spock | ................ | H04L 41/0806 398/45 |
| 2015/0195040 | A1* | 7/2015 | Riani | ...................... | H04L 27/34 398/58 |
| 2016/0204914 | A1* | 7/2016 | Agee | .................... | H04B 7/0413 |
| 2017/0019168 | A1 | 1/2017 | Menard et al. | | |
| 2017/0257260 | A1 | 9/2017 | Govindan et al. | | |
| 2017/0310413 | A1 | 10/2017 | Cai et al. | | |
| 2018/0027312 | A1* | 1/2018 | Adiletta | ............. | G06F 3/0613 398/45 |
| 2018/0041360 | A1* | 2/2018 | Shen | ...................... | H04L 12/44 |

OTHER PUBLICATIONS

Extended Search Report from counterpart European Application No. 18191783.2, dated Apr. 3, 2019, 5 pp.

\* cited by examiner

DATA CENTER PACKET OPTICAL TRANSPORT FAILURE PROTECTION

This application claims the benefit of U.S. Provisional Application No. 62/584,484, filed Nov. 10, 2017, the entire content of which is hereby incorporated by reference.

TECHNICAL FIELD

The disclosure relates to computer networks and, more particularly, routing of network packets within computer networks including data centers.

BACKGROUND

In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls.

In most data centers, clusters of storage systems and application servers are interconnected via a high-speed switch fabric provided by one or more tiers of physical network switches and routers. In some network topologies, routers and switches within the fabric may be layered in a multi-staged configuration that allows for various aspects of path minimization, redundancy, and more efficient routing of network traffic within the fabric. Sophisticated data centers, referred to as distributed data centers, provide infrastructure spread throughout the world with subscriber support equipment located in various interconnected physical hosting facilities.

SUMMARY

In general, this disclosure describes techniques for providing communication protection and resiliency for a packet optical transport system used to transport packet data within a data center, such as a distributed data center having multiple facilities. For example, as described herein, the techniques may be used to quickly and efficiently reroute network traffic, in response to a disruption in connectivity within a portion of the underlying packet optical transport system.

As one example implementation, in a distributed data center, a routing and packet switching topology is utilized in which any of a plurality of leaf network devices (e.g., top-of-rack switches) of a first data center may forward network traffic to any of a plurality of leaf network devices located within a second data center through a single one of a plurality of spine network device (e.g., spine routers/switches) located within either the first data center the second data center. Similarly, any of the leaf network devices of the second data center may forward network traffic to any of the leaf network devices of the first data center through any single one of the plurality of spine network devices. As such, the routing and switching topology is a relatively fast configuration having, in some examples, a single spine node for connections between the leaf nodes operating within the distributed data center.

Moreover, as described herein, in response to a connectivity disruption in an underlying optical transport ring supporting the routing and packet switching topology, one or more of the optical devices of the optical transport ring are modified to reroute communication between at least a subset of the leaf network devices so as to traverse an inter-spine route via the optical modified optical transport ring. That is, in response to a connectivity disruption in a portion of underlying optical transport ring, one or more optical devices within the optical transport ring are modified such that packets between at least a portion of the leaf devices are rerouted along optical paths between at least two of the spine network devices.

Moreover, layer three (L3) routing information within the data center is automatically adjusted (e.g., disaggregated) to introduce routes and reachability information necessary to redirect the affected packets along the newly created optical paths within the underlying optical transport ring. In this way, in response to a connectivity disruption, the techniques enable automatic transition of the routing and switching architecture to one that utilizes one or more multi-hop routes between spine switching devices to accommodate network traffic that may otherwise be lost. Further, the techniques provide for automatic transition back to a routing and switching topology that utilizes a path through a single one of a plurality of spine network device upon restoration of connectivity.

In one example, the disclosure describes a method comprising in a distributed data center system in which a first set of leaf network devices of a first data center communicate with a second set of leaf network devices of a second data center via a single one of a first spine network device of the first data center or a second spine network device of the second data center, determining that connectivity, through a first optical path of an optical transport ring, between the first spine network device of the first data center and at least one leaf network device of the second set of leaf network devices of the second data center is disrupted. The optical transport ring provides the first optical path for transporting packets from the first spine network device of the first data center to the at least one leaf network device of the second data center prior to disruption, and the first optical path in unavailable after disruption. The method also includes in response to the connectivity disruption, configuring one or more packet-optical transport devices of the optical transport ring to establish direct connectivity between the first spine network device and the second spine network device to reroute packets to be transmitted, via the first optical path, to the at least one leaf network device of the second data center. The reroute of the packets is via a second optical path of the optical transport system from the first spine network device to the second spine network device. The method includes communicating, by the first spine network device of the first data center, the packets to the at least one leaf network device of the second data center through the second optical path.

In one example, the disclosure describes a distributed data center system comprising a first spine network device in a first data center having a first set of leaf network devices, a second spine network device in a second data center having a second set of leaf network devices, an optical transport ring having a first optical path, and one or more packet-optical transport devices that interconnect the optical transport ring to the first and second spine network devices and the first and second set of leaf network devices. In the distributed data center system, the first set of leaf network devices of the first data center communicate with the second set of leaf network devices of the second data center via a single one of the first spine network device of the first data center or the second spine network device of the second data center, and the first optical path is for transporting packets from the first spine network device of the first data center to the at least one leaf network device of the second data center prior to a disruption along the first optical path. The system also includes processing circuitry configured to determine that connectivity, through the first optical path of an optical transport ring, between the first spine network device of the first data center and at least one leaf network device of the second set of leaf network devices of the second data center is disrupted, wherein the first optical path in unavailable after disruption, in response to the connectivity disruption, configure one or more of the packet-optical transport devices of the optical transport ring to establish direct connectivity between the first spine network device and the second spine network device to reroute packets to be transmitted, via the first optical path, to the at least one leaf network device of the second data center, wherein the reroute of the packets is via a second optical path of the optical transport system from the first spine network device to the second spine network device, and cause the first spine network device to communicate the packets to the at least one leaf network device of the second data center through the second optical path.

In one example, the disclosure describes a computer-readable storage medium storing instructions that when executed cause one or more processors to in a distributed data center system in which a first set of leaf network devices of a first data center communicate with a second set of leaf network devices of a second data center via a single one of a first spine network device of the first data center or a second spine network device of the second data center, determine that connectivity, through a first optical path of an optical transport ring, between the first spine network device of the first data center and at least one leaf network device of the second set of leaf network devices of the second data center is disrupted. The optical transport ring provides the first optical path for transporting packets from the first spine network device of the first data center to the at least one leaf network device of the second data center prior to disruption, and the first optical path in unavailable after disruption. The computer-readable storage medium also stores instructions that when executed cause the one or more processors to in response to the connectivity disruption, configure one or more packet-optical transport devices of the optical transport ring to establish direct connectivity between the first spine network device and the second spine network device to reroute packets to be transmitted, via the first optical path, to the at least one leaf network device of the second data center. The reroute of the packets is via a second optical path of the optical transport system from the first spine network device to the second spine network device. The computer-readable storage medium also stores instructions that when executed cause the one or more processors to communicate, by the first spine network device of the first data center, the packets to the at least one leaf network device of the second data center through the second optical path.

The details of one or more examples are set forth in the accompanying drawings and the description below. Other features, objects, and advantages will be apparent from the description and drawings, and from the claims.

DETAILED DESCRIPTION

Figure 1:
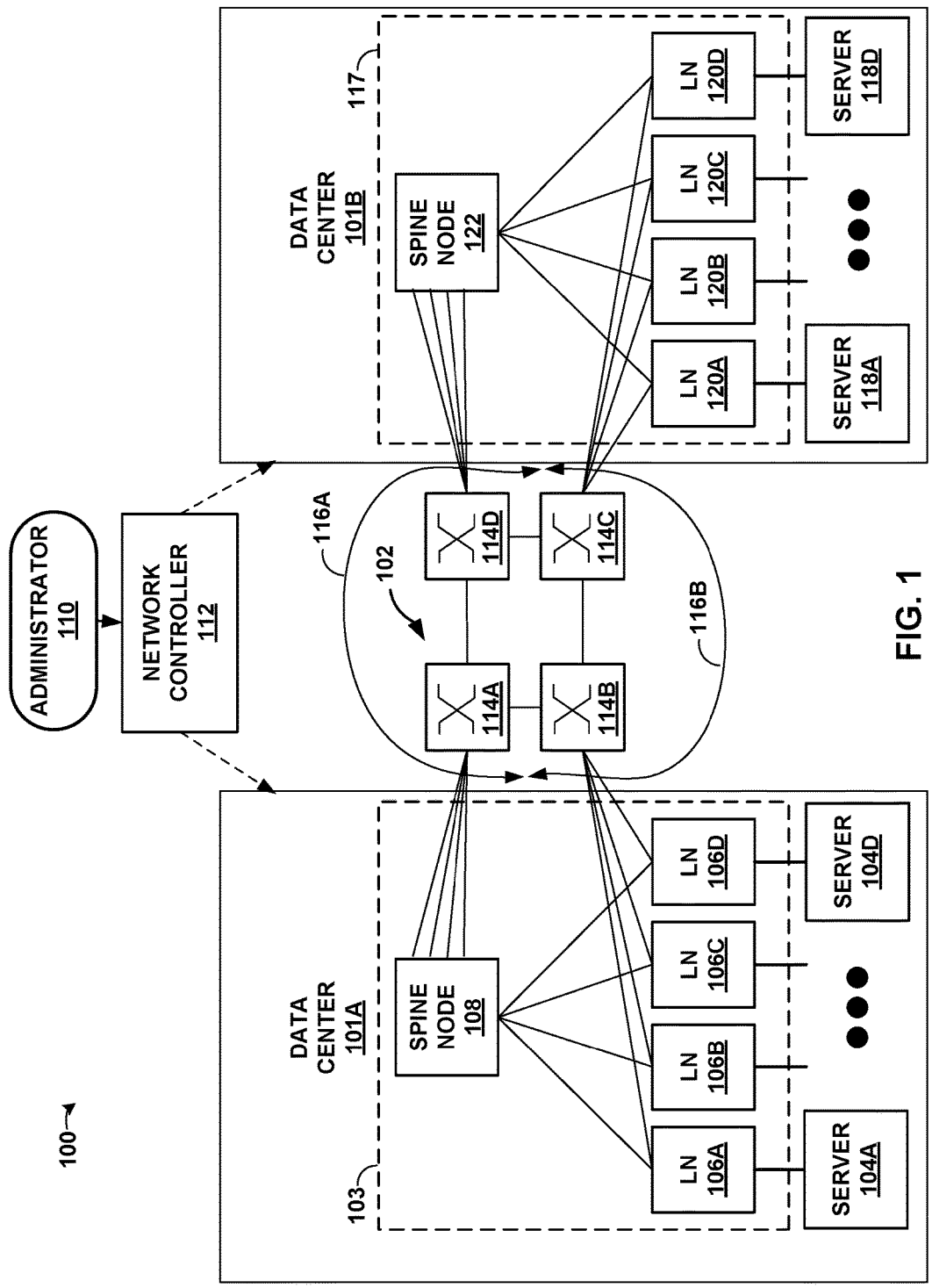
FIG. 1 is a block diagram illustrating an example distributed data center system in which examples of the techniques described herein may be implemented.

FIG. 1 is a block diagram illustrating an example distributed data center 100 in which examples of the techniques described herein may be implemented. In this example, distributed data center 100 includes a data center 101A, data center 101B, and an optical transport ring 102 that provides a communication link between network devices of data center 101A and data center 101B. Although data centers 101A and 101B are illustrated as separate, distinct data centers, data centers 101A and 101B may be logically a common data center. For instance, data centers 101A and 101B operated in a distributed manner to share processing tasks and data storage. In other examples the techniques may be applied to a single, physical data center or computer network to provide resiliency and protection from failure of a portion of an underlying packet optical transport system.

In general, data centers 101A and 101B provide an operating environment for applications and services for customer devices coupled to the data center, e.g., by a service provider network (not shown). Data centers 101A and 101B may, for example, host infrastructure equipment, such as networking and storage systems, redundant power supplies, and environmental controls. In some examples, a service provider network that couples customer devices to data centers 101A and 101B may be coupled to one or more networks administered by other providers, and may thus form part of a large-scale public network infrastructure, e.g., the Internet.

In some examples, data centers 101A and 101B represent one of many geographically distributed data centers. In some examples, data centers 101A and 101B represent distributed data centers located within the same building. For instance, in some cases, cabling wire between floors of a skyscraper may be difficult and require traversing many floors with many wires. In one example, data center 101A may be on one floor of the building, and data center 101B may be on another floor of the building. Such distributed data centers within the same building may be beneficial in locations where real estate is expensive and building vertically is one of the few practical options.

As illustrated in the example of FIG. 1, data centers 101A and 101B may be a facility that provides network services for customers. Customer devices may be devices of entities such as enterprises and governments or individuals. For example, a network data center may host web services for several enterprises and end users. Other example services may include data storage, virtual private networks, traffic engineering, file service, data mining, scientific- or super-computing, and so on. In some examples, data centers 101A and 101B may be individual network servers, network peers, or otherwise. In some examples, data centers 101A and 101B are enterprise or internal data centers.

In the example of FIG. 1, network controller 112 provides a high-level controller for configuring and managing routing and switching infrastructure of data centers 101A and 101B. Although one network controller 112 is illustrated, in some examples, network controller 112 may be a distributed network controller, where each or a plurality of data centers like data centers 101A and 101B include respective network controllers that operate in a distributed manner (e.g., as a series of controllers). One way for such configuration is generalized multiprotocol label switching (GMPLS).

Network controller 112 may represent, for example, a software defined network (SDN) controller that communicates and manages the devices of data centers 101A and 101B using an SDN protocol, such as the Path Computation Element (PCE) Communication Protocol (PCEP). In some examples, network controller 112 may communicate and manage the devices of data centers 101A and 101B using eXtensible Messaging and Presence Protocol (XMPP), PCEP or Border Gateway Protocol messages. Additionally or alternatively, network controller 112 may communicate with the routing and switching infrastructure of data centers 101A and 101B using other interface types, such as a Simple Network Management Protocol (SNMP) interface, path computation element protocol (PCEP) interface, a Device Management Interface (DMI), a CLI, Interface to the Routing System (IRS), or any other node configuration interface.

Network controller 112 provides a logically—and in some cases, physically—centralized controller for facilitating operation of one or more virtual networks within data centers 101A and 101B in accordance with examples of this disclosure. In some examples, network controller 112 may operate in response to configuration input received from network administrator 110. Network controller 112 is shown in FIG. 1 and described herein as one example implementation of the techniques. In other examples, the techniques may be applied without use of a network controller.

In FIG. 1, data center 101A includes a set of storage systems and application servers 104A-104D (collectively referred to as "servers 104") interconnected via fabric 103, which may comprise a fabric provided by one or more tiers of physical network devices, such as, for example, routers, gateways, switches, hubs, modems, bridges, repeaters, multiplexers, servers, virtual machines running on one or more of the same, and other example network devices. In the example of FIG. 1, fabric 103 includes two tiers of nodes: spine node 108, and leaf nodes 106A-106D. Leaf nodes 106 represent a first tier of routing/switching devices for the switch fabric 103 can typically forward packets to and from respective servers 104, 118 of data center 101B. Leaf nodes 106 may, for example, be so called top-of-rack (TOR) switching devices. Spine nodes 108, 122 represent a second tier of routing/switching devices within the switch fabric and typically are high-end core switches having increased switching capacity. Other topologies may be used in other examples.

Servers 104 provide execution and storage environments for applications and data associated with the customers and may be physical servers, virtual machines or combinations thereof. Although not shown, data center 101A may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, fabric 103 represents layer two (L2) and layer three (L3) switching and routing components that provide point-to-point connectivity between servers 104. In one example, fabric 103 comprises a set of interconnected, high-performance packet-based routers and switches that implement industry standard protocols. In one example, fabric 103 may comprise components that provide Internet Protocol (IP) point-to-point connectivity.

As shown in the example of FIG. 1, each spine node 108 is communicatively coupled to each of leaf nodes (LN) 106 in fabric 103. Multi-stage data center networks, such as Clos or networks with a so-called "fat tree" topology, may be used in data centers for high performance and resiliency. These fat tree networks may allow for multi-pathing. As one example, a Virtual Chassis Fabric (VCF), in addition to allowing a multi-staged Clos network to be managed as a single device, also allows path weights to reflect and react to path's end-to-end bandwidth. Such a capability is termed "smart trunks" in VCF. The smart trunks capabilities are enabled by the Virtual Chassis Control Protocol (VCCP) that runs inside a VCF to provide globally optimized weights on the multi-paths. A fabric, such as fabric 103, is a loosely-federated folded multi-stage network where all nodes of the fabric run IP routing protocols.

The routing protocols, which may include, for example, external border gateway protocol (EBGP), include all paths between leaf nodes 106 in fabric 103, and equal cost multipath (ECMP) is used to utilize all paths. The Routing in Fat Trees (RIFT) protocol allows use of any set of all available least-hops paths disregarding ECMP constraints. Additional information regarding RIFT can be found in Internet-Draft entitled RIFT: ROUTING IN FAT TREES (DRAFT-PRZYGIENDA-RIFT-03), dated Oct. 28, 2017, as promulgated by the Internet Engineering Task Force (IETF), made publicly available at www.ietf.org, which is hereby incorporated by reference.

Data center 101B may be substantially similar, including identical, to data center 101A. For example, servers 118A-118D may be similar to servers 104. Leaf nodes 120A-120D may be similar to leaf nodes 106, spine node 122 may be similar to spine node 108, and fabric 117 may be similar to fabric 103.

In examples described in this disclosure, during normal operation, each one of leaf nodes 106 may forward traffic to any one of leaf nodes 120, and vice-versa, via optical transport ring 102 along a path through one of spine node 108 and spine node 122. As such, the routing and switching topology may be viewed as a connection with a single one of spine node 108 and spine node 122 between the leaf nodes operating within the distributed data center.

This topology may provide certain advantages, such as providing fast, reduced hop interconnectivity between the leaf nodes 106, 120 in a way that does not require optical transport ring 102 to support too many wavelengths. For example, it may be possible for any one of leaf nodes 106 to communicate with any one of leaf nodes 120 without necessarily passing through spine node 108 or spine node 122. Such a configuration may be considered as leaf node-to-leaf node, and may be achieved with wavelengths assigned to each leaf nodes 106 and each leaf nodes 120 to communicate with each other (e.g., wavelengths assigned to leaf node 106A to communicate with each one of leaf nodes 120, wavelengths assigned to leaf node 106B to communicate with each one of leaf nodes 120, and so forth). To achieve such leaf node-to-leaf node communicate may require optical transport ring 102 to support more wavelengths that would be practical. By using a single-hop routing and switching topology with a connection with a single one of spine node 108 and spine node 122, data centers 101A and 101B can communicate with one another without overloading wavelengths on optical transport ring 102.

As an example, in one way, leaf node 106A (which an example leaf network device) forwards packets to leaf node 120A through a path that includes spine node 108, through optical transport ring 102, and then to leaf node 120A. In another way, leaf node 106A communicates packets to leaf node 120A through a path that includes optical transport ring 102, spine node 122, and then to leaf node 120A. Each of leaf nodes 120 may similarly communicate with leaf nodes 106 in one of these two example ways (e.g., via spine node 122 and to leaf node 106 through optical transport 102, or via optical transport 102 to spine node 108, and then leaf node 106). In this way, FIG. 1 illustrates an example distributed data center system 100 in which a first set of leaf network devices of a first data center (e.g., leaf nodes 106 of data center 101A) are able to communicate packets with a second set of leaf network devices of a second data center (e.g., leaf nodes 120 of data center 101B) via a single one of a first spine network device of the first data center (e.g., spine node 108) or a second spine network device of the second data center (e.g., spine node 122).

In general, spine nodes 108 and 122 execute routing protocols that maintain routing information that reflects the reachability and paths available according to this routing and switching topology. For example, during normal operation, routes to individual leaf nodes may be aggregated within the routing information maintained by spine nodes 108 and 122 and advertised to the leaf nodes such that each spine node announces aggregate reachability to a prefix associated with the leaf nodes of its respective data center. In other words, individual host routes for each leaf node need not necessarily be advertised. Moreover, from the perspective of a leaf node, any other leaf node is reachable via the aggregate routes through spine nodes 108, 122.

In this example, optical transport ring 102 includes a plurality of packet-optical transport devices 114A-114D (collectively packet-optical transport devices 114). Examples of packet-optical transport devices 114 include Re-configurable Optical Add Drop Multiplexers (ROADMs), Photonic Cross Connects (PXCs), Optical Cross-Connects (OXCs), and Dense Wavelength Division Multiplexing equipment (DWDMs). For ease of description, packet-optical transport devices 114 are described with respect to ROADMs.

Packet-optical transport devices 114 carry the packets of data via optical signals having different wavelengths. In some examples, packet-optical transport devices 114 are not configured to perform any switching of packets. Rather, packet-optical transport devices 114 form as a conduit to pass through optical signals having different wavelengths from nodes of data centers 101A and 101B.

As illustrated, spine node 108 transmits packets to and receives packets from optical transport 102 via packet-optical transport device 114A, and spine node 122 transmits packets to and receives packets from optical transport 102 via packet-optical transport device 114D. Leaf nodes 106 transmit packets and receive packets from optical transport 102 via packet-optical transport device 114B, and leaf nodes 120 transmit packets and receive packets from optical transport 102 via packet optical transport device 114C. Other configurations are possible. Example operation of optical transport 102 and packet-optical transport devices 114 is described in U.S. Pat. No. 9,369,785, issued Jun. 14, 2016, the content of which is incorporated by reference as providing merely one non-limiting manner in which optical transport 102 and packet-optical transport devices 114 may operate.

For example, leaf nodes 120 are connected straight through to spine 108 via optical transport 102, and packet-optical transport devices 114 facilitate that connection, but may not provide any packet switching capabilities. In this way, leaf nodes 120 and leaf nodes 106 may not be able to communicate with each other except via one of spine node 108 or spine node 122. Packet-optical transport devices 114 may not reroute packets, but instead provide the structure to transmit optical signals carrying the packets through the optical transport 102.

For leaf nodes 106 and leaf nodes 120 to communicate with one another, network controller 112, or some other device, assigns optical wavelengths to leaf nodes 106 and 120. Respective ones of packet-optical transport devices 114 may transmit optical signals carrying packets out onto optical transport ring 102 and transmit optical signals carrying packets back to leaf nodes 106 and 120 based on assigned wavelengths. In these examples, the optical signals carrying packets is described as an example, and should not be considered limiting. From the perspective of packet-optical transport devices 114, packet-optical transport devices 114 are facilitating the transfer of optical signals having different wavelengths. The data carried by the optical signals, or the manner in which the data is arranged may not impact the operation of packet-optical transport devices 114. The actual data (e.g., packets) may be parsed and evaluated at the various nodes (e.g., spine nodes 108, 122 or leaf nodes 106, 120). In some examples, the assigned wavelengths may be assigned paths through optical transport ring 102. As one example, FIG. 1 illustrates path 116A and path 116B.

As one example, assume that optical transport ring 102 can support 200 wavelengths. In this example, network controller 112 assigns 20 wavelengths to establish leaf node 106A to spine node 122 connectivity, 20 wavelengths to establish leaf node 106B to spine node 122 connectivity, 20 wavelengths to establish leaf node 106C to spine node 122 connectivity, 20 wavelengths to establish leaf node 106D to spine node 122 connectivity, 20 wavelengths to establish leaf node 120A to spine node 108 connectivity, 20 wavelengths to establish leaf node 120B to spine node 108 connectivity, 20 wavelengths to establish leaf node 120C to spine node 108 connectivity, and 20 wavelengths to establish leaf node 120D to spine node 108 connectivity, for a total of 160 wavelengths. This leaves 40 unused wavelengths. In one example, optical path 116A may carry 50% of the wavelengths (e.g., from leaf nodes 106A, 106C, 120A, and 120C), and optical path 116B may carry 50% of the wavelengths (e.g., from leaf nodes 106B, 106D, 120B, and 120D). In this example, 80 of the 160 wavelengths are for optical path 116A, and the other 80 of the 160 wavelengths are for optical path 116B.

This example is provided merely to assist with understanding and in no way should be considered limiting. There may be more or fewer than 100 wavelengths, more or fewer than 20 wavelengths per leaf node, and there may be a different distribution of wavelengths along path 116A and 116B. Moreover, the split of wavelengths between path 116A and 116B need not necessarily be 50-50.

Network controller 112 may configure packet-optical transport device 114B to transmit packets received from leaf nodes 106A and 106C through path 116A (so-called northbound path) to spine node 122. For example, network controller 112 configures packet-optical transport device 114B to transmit optical signals having wavelengths assigned to leaf nodes 106A and 106C through path 116A to spine node 122. Network controller 112 configures packet-optical transport device 114C to transmit packets received from leaf nodes 120A and 120C through path 116A (so-called northbound path) to spine node 108. For example, network controller 112 configures packet-optical transport device 114C to transmit optical signals having wavelengths assigned to leaf nodes 120A and 120C through path 116A to spine node 108.

Network controller 112 configures packet-optical transport device 114B to transmit packets received from leaf nodes 106B and 106D through path 116B (so-called southbound path) to spine node 122. For example, network controller 112 configures packet-optical transport device 114B to transmit optical signals having wavelengths assigned to leaf nodes 106B and 106D through path 116B to spine node 122. Network controller 112 configures packet-optical transport device 114B to transmit packets received from leaf nodes 120B and 120D through path 116B (so-called southbound path) to spine node 108. For example, network controller 112 configures packet-optical transport device 114C to transmit optical signals having wavelengths assigned to leaf nodes 120B and 120D through path 116B to spine node 108.

In some cases, there may be connectivity disruption (e.g., failure in optical transport ring 102). For example, there may be cut or failure, such as hardware failure, along path 116A or 116B, such as within the optical link or hardware associated with the optical link between packet optical transport devices 114B and 114C, which impacts the ability for traffic to flow between at least a subset of leaf nodes 106 and 120 to respective spine nodes (e.g., subset of leaf nodes 106 to spine node 122, and subset of leaf nodes 120 to spine node 108). As an example, in the above example, packets from leaf nodes 106B and 106D are transmitted through path 116B to spine node 122 via packet optical transport system 102.

However, due to the connectivity disruption, leaf nodes 106B and 106D may not be able to transmit to spine node 122, which impacts the ability of leaf nodes 106B and 106D to communicate with leaf nodes 120. For example, servers 104B and 104D are unable to communicate with servers 118B and 118D since leaf nodes 106B and 106D cannot communicate with spine node 122 (e.g., due to disruption on path 116B), and spine node 108 cannot communicate with leaf nodes 120B and 120D (e.g., due to disruption on page 116B). Accordingly, servers 104B and 104D and servers 118B and 118D cannot communicate with one another. Similarly, in the above example, packets from leaf nodes 120B and 120D are transmitted through path 116 to spine node 108. However, due to connectivity disruption, leaf nodes 120B and 120D may not be able to transmit to spine node 108, which impacts the ability of leaf nodes 120B and 120D to communicate with leaf nodes 106.

One example way to address the connectivity disruption is to reroute all packets through the existing path(s) that remain intact. For example, if there is connectivity disruption in path 116B, all data may be routed through path 116A without modification of the routing information such that all traffic continues to utilize a single one of spine nodes 108, 122. For example, packet-optical transport devices 114 wrap traffic onto the remaining part of optical transport ring 102 (e.g., path 116A in this example). However, such techniques may be inefficient in terms of wavelength usage. For instance, to accommodate for such a failure condition, the wavelength spectrum available in optical transport ring 102 may be configured to use only up to 50% so as to leave enough reserved and unassigned optical wavelengths to protect the failed segment (e.g., path 116B in this example).

For instance, as described above, 160 wavelengths are assigned to the leaf nodes (e.g., 20 wavelengths per leaf node). However, in some existing techniques, rather than assigning all 160 wavelengths, network controller 112 would only assign 80 wavelengths (e.g., 10 wavelengths per leaf node). The other 80 wavelengths would remain unused and available to warp traffic onto the remaining part of the optical transport ring 102. The reduction in the number of wavelengths currently be used (e.g., 80 instead of 160 wavelengths) impacts throughput as optical transport ring 102 is carrying substantially less data than its capabilities.

In accordance with example techniques described in this disclosure, in response to a connectivity disruption, one or more devices, such as any of spine nodes 108, 122, or network controller 112, may output commands to reconfigure one or more packet-optical transport devices 114 of optical transport ring 102 to optically reroute packets to be transmitted via optical path 116B such that the packets optically traverse path 116A. Moreover, spine nodes 108, 122 and/or network controller 112 execute routing protocols to modify the routing information defining the reachability for the routing and switching topology so as to inject one or more new inter-spine routes, i.e., one or more routes in which traffic flows between leaf nodes 106, 120 via multiple hops through spine nodes 108, 122 in this example, as shown as path 128 in FIG. 2 and explained in more detail below. In response to failure, unaffected routes to individual leaf nodes may remain aggregated within the routing information maintained by spine nodes 108 and 122.

However, the routing protocols on the spine nodes (e.g., via the network controller 112) announce to each other disaggregated routes (e.g., host routes) advertising reachability information for the individual leaf nodes that are reachable through it. As such, routing tables within each of the spine devices are updated to include routing paths to the affected leaf nodes via one of the other spine devices. In such failure conditions, affected leaf nodes injecting traffic in the switch fabric detect the failure condition and forward packets to local spine network devices according to existing routing information in their local routing tables.

Rather than attempting to forwards the network traffic to the destination leaf node via the failed path according the previous, aggregate routing information, the spine network device directs the network traffic to the other spine network device in accordance with the newly injected, host route for the leaf node. In this way, individual host routes for affected leaf node need may be automatically disaggregated and injected into the routing tables for the spine network devices so as to temporarily create a hybrid routing and switching topology in which unaffected paths through the underlying optical transport system remain as single-hop communications through the spine and the affected paths are protected via modification of the optical system and introducing multi-hop, inter-spine routes within the routing information for the data center.

Figure 2:
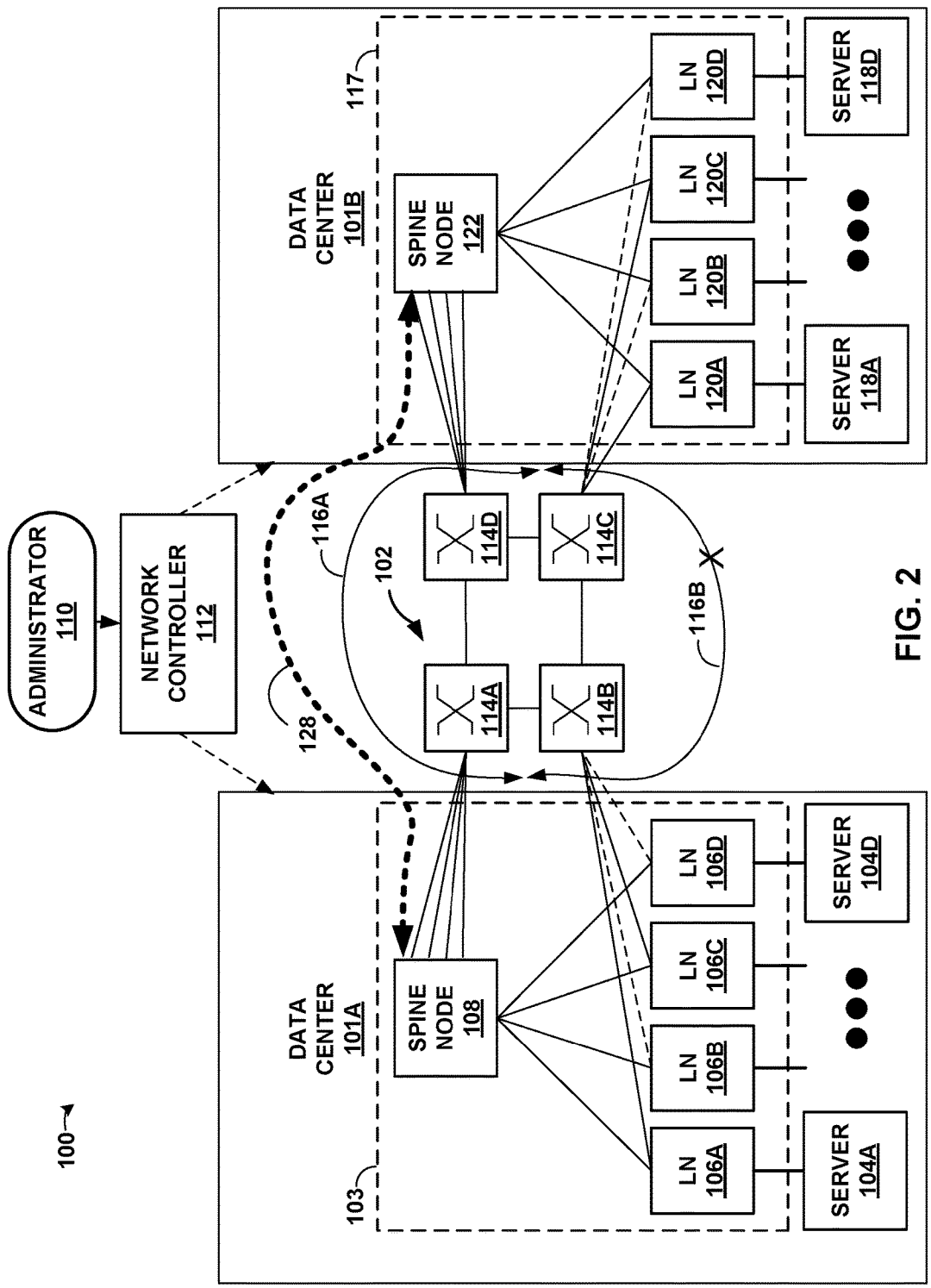
FIG. 2 is another block diagram illustrating an example network including distributed data center system in which examples of the techniques described herein may be implemented.

FIG. 2 is another block diagram illustrating an example network including distributed data center system in which examples of the techniques described herein may be implemented. The example illustrated in FIG. 2 is similar to that of FIG. 1, but FIG. 2 further illustrates example rerouting of packets in response to a connectivity disruption.

As illustrated with "X," in the example illustrated in FIG. 2, connectivity along path 116B may be disrupted (e.g., failure on path 116B). Examples of connectivity disruption include fiber cut, hardware malfunction, bit-error rate (BER) becoming larger than a threshold BER, and the like, associated with packet optical devices 114B, 114C and the optical link therebetween.

Also, in the example of FIG. 2, leaf nodes 106B, 106D, 120B, and 120D may communicate via path 116B. However, since there is connectivity disruption along path 116B, packet-optical transport device 114B may not transmit any packets to leaf nodes 106B and 106D, and packet-optical transport device 114C may not transmit any packets to leaf nodes 120B and 120D. Therefore, the connection between leaf nodes 106A and 106D and packet-optical transport device 114B is illustrated with dashed lines, and the connection between leaf nodes 120B and 120D and packet-optical transport device 114C is illustrated with dashed lines. The actual physical connection between leaf nodes 106B and 106D and packet-optical transport device 114B may persist, and the actual connection between leaf nodes 120B and 120D and packet-optical transport device 114C may persist. The dashed lines are used to show that the communication path may longer be available.

In one or more examples in accordance with this disclosure, to address the connectivity disruption, spine node 108 may configure one or both of packet-optical transport devices 114A and 114D, and/or spine node 122 may configure one or both of packet-optical transport devices 114A and 114D to transmit along routing path 128 to connect spine node 108 and spine node 122. In the example illustrated in FIG. 1, there may not be a direct path between spine node 108 and spine node 122, where direct path means directly through optical transport ring 102. For example, in the example illustrated in FIG. 1, spine node 108 may not include an entry in its routing table that allows spine node 108 to route packets to spine node 122 such that spine node 122 directly (e.g., without passing through any of leaf nodes 120) receives the packet as an output from packet-optical transport device 114D. Similarly, in the example illustrated in FIG. 1, spine node 122 may not include an entry in its routing table that allows spine node 122 to route packets to spine node 108 directly (e.g., without passing through any of leaf nodes 106) receives the packet as an output from packet-optical transport device 114A.

In accordance with examples described in this disclosure, spine node 108 and/or spine node 122 may form a new routing path 128 that allows spine node 108 to transmit packets through packet-optical transport device 114A, packet-optical transport device 114D, and then to spine node 122. Routing path 128 is a shortcut between spine node 108 and spine node 122. Routing path 128 also allows spine node 122 to transmit packets through packet-optical transport device 114D, packet-optical transport device 114A, and then to spine node 108.

There may be various way in which spine node 108 and/or spine node 122 may establish a logical connection. As one example, spine node 108 may reassign wavelengths in optical transport ring 102, which were assigned to leaf nodes 120B and 120D that cannot communicate with at least one of leaf nodes 106 via a single one of spine node 108 or spine node 122 to wavelengths for communication along routing path 128. For example, prior to the connectivity disruption, leaf nodes 106 communicate with leaf nodes 120 through either spine node 108 or spine node 122. However, because of the disruption in path 116B, leaf nodes 106B and 106D cannot communicate with leaf nodes 120 through a single one of spine node 108 or spine node 122. Accordingly, the wavelengths assigned to leaf nodes 106B and 106D may be available for reassignment to packet communication along routing path 128. Similarly, because of the disruption in path 116B, leaf nodes 120B and 120D cannot communicate with leaf nodes 106 through a single one of spine node 108 or spine node 122. Accordingly, the wavelengths assigned to leaf nodes 120B and 120D may be available for reassignment to packet communication along routing path 128.

For instance, simply to assist with understanding, assume that leaf nodes 120B and 120D were each assigned N wavelengths of the total available wavelengths for transmission along path 116B. However, the N wavelengths for leaf node 120B and the N wavelengths for leaf node 120D are available for reassigning because transmission along path 116B may not be possible due to the disruption.

In some examples, rather than or in addition to reassigning wavelengths, network controller 112 assigns the unused wavelengths. For example, assume optical path 116B can handle 100 wavelengths, and assume 40 wavelengths were assigned to leaf nodes 106B and 106D to communicate with spine node 122, and 40 wavelengths were assigned to leaf nodes 120B and 120D to communicate with spine node 108. In this example, 80 wavelengths become available (e.g., those assigned to leaf nodes 106B, 106D, 120B, and 120D). However, rather than or in addition to reusing the 80 wavelengths assigned to leaf nodes 106B and 106D, network controller 112 may assign spine node 108 wavelengths from the 20 unassigned wavelengths or reuse 20 of the 80 wavelengths along path 116A. For example, along path 116A, leaf nodes 106A, 106C, 120A, and 120C may still be utilizing the 80 wavelengths assigned to these nodes. Therefore, there are now 100 wavelengths being used along path 116A, and spine node 108 and spine node 122 are directly connected. In some examples, because 100 wavelengths are used to carry data that was previously carried along 160 wavelengths prior to the disruption, to address throughput issues, spine nodes 108 and 122 may communicate at a higher data rate so that the same amount of data can be transmitted within the same amount of time as prior to the disruption.

In general, there should be a so-called "light path" between spine node 108 and spine node 122 to allow packet communication along optical path 128. This light path can be achieved by network controller 112 reassigning wavelengths of leaf nodes that can no longer communicate along path 116B, and/or by network controller 112 assigning previously unassigned wavelengths.

In examples where network controller 112 reassigns or assigning previously unassigned wavelengths (e.g., unused wavelengths) to form the light path for optical path 128, there may be a possibility that network controller 112 reassigns or assigns fewer wavelengths than were previously assigned. For instance, in the above example, controller 112 or spine nodes 108, 122 assigned leaf nodes 106B, 106D, 120B, and 120D a total of 80 wavelengths of the 100 wavelengths that path 116B can support. Similarly, along path 116A, controller 112 or spine nodes 108, 122 assigned leaf nodes 106A, 106C, 120A, and 120C a total of 80 wavelengths of the 100 wavelengths that path 116A can support. Therefore, there are 20 wavelengths along path 116A that are unassigned. In some examples, controller 112 or spine nodes 108, 122 may assign the 20 wavelengths available along path 116A to the direct connection between spine node 108 and spine node 122 of optical path 128.

Network controller 112 may assign spine node 108 the 20 unassigned wavelengths to transport packets from leaf nodes 106B and 106D to spine node 122 via optical path 128. In this example, leaf nodes 106B and 106D were originally assigned 40 wavelengths for optical path 116B, but, now, only 20 wavelengths are being used for communication along optical path 128. In this case, there may be a possibility of slow down in the throughput because fewer wavelengths are available to transmit the same amount of data.

In some examples, digital signal processors (DSPs) of spine node 108 and spine node 122 may program performance (e.g., from 100 Gbits/s to 400 Gbits/s). This allows spine node 108 and spine node 122 to increase the data rate in response to a connectivity disruption so that there is less impact on the amount of data that can be outputted by spine node 108 and spine node 122. Therefore, there may not need to be an increase in wavelength allocation because the same wavelength optical signal can carry more data per unit of time due to the higher data rate. For instance, fewer wavelengths may be needed for communication between spine node 108 and spine node 122 as compared to between spine node 108 and leaf nodes 120, or spine node 122 and leaf nodes 106.

For instance, assuming during normal operation (e.g., no disruption on optical path 116B), spine node 108 and spine node 122 may be configured to transmit and receive packets at a data rate of approximately 100 Gbits/s over the 40 wavelengths based on the amount of data that needs to be communicated. In one or more examples, spine node 108 and spine node 122 may modulate the data in the packets using binary phase shift keying (BPSK) to achieve the 100 Gbits/s rate.

However, after disruption, rather than using the 40 wavelengths only 20 wavelengths may be available. Therefore, spine node 108 and spine node 122 may be configured (e.g., by network controller 112 or by themselves) to transmit and receive packets at a data rate of approximately 200 Gbits/s. In this example, there is double the data rate (e.g., from 100 Gbits/s to 200 Gbits/s) with half the wavelengths (e.g., from 40 wavelengths to 20 wavelengths), resulting in very little change in the throughput. In one or more examples, spine node 108 and spine node 122 may modulate the data in the packets using quadrature phase shift keying (QPSK) to achieve the 200 Gbits/s rate.

In some examples, rather than using all 20 of the unused wavelengths (e.g., previously unassigned wavelengths), network controller 112 may assign only 10 of the 20 unused wavelengths. In such examples, spine node 108 and spine node 122 may be configured (e.g., by network controller 112 or by themselves) to transmit and receive packets at a data rate of approximately 400 Gbits/s. In this example, there is quadruple the data rate (e.g., from 100 Gbits/s to 400 Gbits/s) with a quarter of the wavelengths (e.g., from 40 wavelengths to 10 wavelengths), resulting in very little change in the throughput. In one or more examples, spine node 108 and spine node 122 may modulate the data in the packets using 16-QAM (quadrature amplitude modulation) to achieve the 400 Gbits/s rate.

The example values used in the above example, such as 40 wavelengths, 20 wavelengths, and 10 wavelengths, 100 Gbits/s, 200 Gbits/s, and 400 Gbps/s are all used merely to assist with understanding, and should not be considered limiting. There may be more or fewer wavelengths, and the data rates may be different. Also, BPSK, QPSK, and 16-QAM are example modulation schemes, and the techniques described in this disclosure should not be considered limited to these modulation schemes.

As an example, southbound traffic (e.g., path 116B) connecting leaf nodes 106B, 106D, 120B, and 120D starts from blue wavelength filling up to red spectrum (e.g., short wavelength (blue) to long wavelength (red)). Northbound traffic (e.g., path 116A) connecting leaf nodes 106A, 106C, 120A, and 120C starts from red wavelength (long wavelength) filling up to the blue spectrum (short wavelength). Northbound and southbound traffic can overlap in spectrum having some planned wavelength non-overlapped (e.g., unassigned wavelengths). In case of connectivity disruption, non-overlapping wavelengths are switched to shortcut routing path 128. This may allow for fast switchover as wavelength can be kept, and there may be no need to re-tune wavelength, which may be a slow process.

Because path 116B is no longer available, spine node 108 and spine node 122 may need to disaggregate leaf nodes that are not accessible via path 116B, and advertise information to indicate that a path through routing path 128 is available to access leaf nodes. For example, spine node 108 may disaggregate in a routing table the routing prefixes of leaf nodes 120B and 120D because spine node 108 may not be able to directly access leaf nodes 120B and 120D. Similarly, spine node 122 may disaggregate in a routing table the routing prefixes of leaf nodes 106 because spine node 122 may not be able to directly access leaf nodes 106B and 106D.

Leaf nodes 106 and 120 may include routing tables that include equal-cost multi-path (ECMP) default routes that included routes through both spine nodes 108 and 122 to leaf nodes in data centers 101A and 101B. However, after the connectivity disruption, forwarding paths for leaf nodes 106B and 106D may be so that leaf nodes 106B and 106D only forward packets via spine node 108. Similarly, forwarding paths for leaf nodes 120B and 120D may be set so that leaf nodes 120B and 120D only forward packets via spine node 122. For example, the default path may be set only through spine node 108 for leaf nodes 106B and 106D, or only through spine node 122 for leaf nodes 120B and 120D. In some examples, the routing tables may be updated to disaggregate paths through spine node 122 for leaf nodes 106B and 106D, or to disaggregate paths through spine node 108 for leaf nodes 120B and 120D. However, changes to the routing tables may not be necessary in all examples.

As an example, based on the routing tables within leaf nodes 106 that are going to communicate with leaf node 120B or 120D, leaf nodes 106 may generate a packet for transmission through spine node 108. Prior to disruption, spine node 108 transmitted data along path 116B. However, after disruption, it is in spine node 108 that the packet is rerouted through routing path 128 to spine node 122, and then to leaf node 120B or 120D. Similarly, based on the routing tables within leaf nodes 120 that are going to communicate with leaf nodes 106B or 106D, leaf nodes 120 may generate a packet for transmission through spine node 122. Prior to disruption, spine node 122 transmitted data along path 116B. However, after disruption, it is in spine node 122 that the packet is rerouted through routing path 128 to spine node 108, and then to leaf nodes 106B or 106D. Again, routing path 128 may establish a direct connectivity between spine nodes 108 and 122 (e.g., a connection that does not go through any of the leaf nodes 106, 120).

As noted above, in some examples spine nodes 108 and 122, and leaf nodes 106 and 120 may communicate in accordance with the RIFT protocol. The RIFT protocol may allow for automatic disaggregating. Accordingly, in some examples, spine nodes 108 and 122 may automatically disaggregate, as described above.

As described above, network controller 112 may create light path so that spine nodes 108 and 122 may directly communicate with one another (e.g., not go through leaf nodes 116 or 120) when there is a disruption. Without disruption, spine nodes 108 and 122 may not directly communicate with one another, and may communicate through leaf nodes 116 or 120.

One way to create the light path is for network controller 112 (although spine nodes 108 and 122 may perform such operations), is for spine nodes 108 and 122 to reuse physical ports that were dedicated for transmission along path 116B to transmit along path 128. For instance, network controller 112 may reassign one or more ports of spine node 108 used to transmit packets to leaf nodes 120B and 120D via optical path 116B to transmit packets to spine node 122 via optical path 128. Network controller 112 or spine node 122 may perform similar operations to reassign one or more ports of spine node 122 used to transmit packets to leaf nodes 106B and 106D via optical path 116B to transmit packets to spine node 108 via optical path 128.

In some examples, network controller 112 may utilize the failed ports (e.g., ports of spine node 108 connected to leaf nodes 106B and 106D, and ports of spine node 122 connected to leaf nodes 120B and 120D) to create shortcut for routing path 128. Only a fraction of failed connections are used to establish the shortcut routing path 128. The links affected by failure and not affected by the shortcut routing path 128 remain as sensors to detect repair of the connectivity disruption. After repair, shortcut routing path 128 may be reconfigured to build CLOS.

There may be various ways in which spine nodes 108 and 122 may determine that there is connectivity disruption. One example is loss of signal at respective leaf nodes 106 and 120 that is indicative of connectivity disruption. As one example, spine nodes 108 and 122 may execute the bidirectional forwarding detection (BFD) protocol, e.g., in association with one or more interfaces, to determine that there is no communication with leaf nodes 120B and 120D. As additional examples, spine nodes 108 and 122 may utilize periodic messages associated with routing or other protocols to transmit hello/ping signals that, if not acknowledged, indicate there is communication failure with leaf nodes 120B and 120D. In some examples, both the BFD protocol and the hello/ping signals may be used since hello/ping signals may carry more information that BFD, and may determine that adjacency cannot be formed even if BFD connectivity exists. There may be other example handshakes.

The BFD protocol is commonly used between two routing devices in order for each router to closely monitor the state (e.g., health) of the other routing device. For example, two of spine nodes 108 and leaf nodes 120 or spine node 122 and leaf nodes 106 that exchange routing information may establish a BFD session for sending and responding to status inquiries in the form of Hello packets or Echo packets, either asynchronously or when needed (e.g., as in the BFD Demand Mode). In either case, the BFD protocol provides a very short interval of time between which the spine and/or leaf nodes must transmit periodic messages, and thus may facilitate the quicker detection of failures by spine and/or leaf nodes that are in an active BFD session.

As another example, in the RIFT protocol, spine nodes 108 and 122 may monitor connections to leaf nodes 120, and in response to the monitoring of RIFT protocol, spine nodes 108 and 122 may determine that there is no communication with leaf nodes 120B and 120D. For example, the circuits on spine nodes 108 and 122 that implement the RIFT protocol may generate an alarm that indicates that there is no communication with leaf nodes 120B and 102D.

RIFT may provide optimal routing in normal case (e.g., example of FIG. 1) where leaf nodes 106 and 120 only hold default routes. RIFT may automatically de-aggregate/re-aggregate the routing prefixes at spine node 108 and/or spine node 122 over the so-called East-West link (e.g., link over routing path 128) when necessary.

Based on lack of communication with leaf nodes 120B and 120D, spine node 108 may determine that there is connectivity disruption along path 116B. The same process may apply to spine node 122 for spine node 122 to determine that there is connectivity disruption along path 116B.

Although the above example techniques are described as being performed by spine node 108 or spine node 122, the techniques described in this disclosure are not so limited. In some examples, network controller 112 may configure the packet-optical transport devices 114 and/or disaggregate and advertise the routing information, such as routing prefixes. Also, in some examples, network controller 112 may determine that there is connective disruption.

Because the example techniques may be performed by network controller 112, spine node 108, spine node 122, or some other component, the example techniques can be considered as being performed by processing circuitry. The processing circuitry may be fixed-function circuitry or programmable circuitry. Examples of the processing circuitry include processors of network controller 112, spine node 108, spine node 122, or any combination of the processors.

In some examples, the connectivity disruption may be repaired, and routing path 128 may no longer be needed. For example, one or more of packet-optical transport devices 114 may detect fiber is repaired (e.g., connectivity disruption repaired). In response, spine nodes 108 and 122 may detect that path 116B is available (e.g., access by spine node 108 to leaf nodes 120B and 120D is possible, and access by spine node 122 to leaf nodes 106B and 106D is possible). In some cases, packet-optical transport devices 114 may notify spine nodes 108 and 122 of the repair. Spine nodes 108 and 122 may then trigger packet-optical transport devices 114 to remove routing path 128 and connect to leaf nodes 120B and 120D for spine node 108 and to leaf nodes 106B and 106D for spine node 122. In some examples, leaf nodes 120B and 120D may connect to spine node 108, and leaf nodes 106B and 106D may connect to spine node 122 on a one-by-one basis to gradually change the connectivity pattern. In this case, the topology may be recovered back to the example illustrated in FIG. 1.

The example techniques described above may provide various advantages. For instance, in some other techniques, where routing path 128 is not created, 50% of the ring capacity is set aside to wrap traffic in case of failures. However, traffic between nodes that use path 116B is a small fraction of the lost capacity. All traffic within fabric 103 and 117 still works (e.g., leaf node 106A and leaf node 106B can communicate with each other), and all traffic between leaf nodes 106A and 106C to leaf nodes 120A and 120C works as before the disruption. Although most routes are still available, these other techniques require setting aside 50% of ring capacity.

Also, these other techniques cause meandering harmonica traffic. For example, one way to route traffic for leaf node 106B to leaf nodes 120, in these other techniques, would be for leaf node 106B to transmit to spine node 108, which transmits back leaf node 106C, which then transmits to spine node 122, and then to one or more of leaf nodes 120. The same would apply for leaf node 120B or 120D communicated with leaf nodes 106. Such back and forth traffic within the same fabric 103 or 117 may be necessitated by default host-prefix routing, which is expensive on Top of Rack Switch (ToRs), and may not be desirable.

In the techniques described in this disclosure, only a fraction of spectrum available on the optical transport ring 102 is required to be reserved for protection (e.g., 20 wavelengths of the 100 wavelengths available for nodes 106, and 20 wavelengths or the 100 wavelengths available for nodes 120), which results in installed hardware being fully utilized. Also, changing modulation scheme for routing path 128 allows to increase cross data center bandwidth with fewer wavelengths. For instance, by changing operation of spine node 108 and 122 to output at 400 Gbit/s, instead of 100 Gbits/s, the same throughput is achieved without needing extra wavelengths. The connectivity disruption may be addressed relatively quickly (e.g., hundreds of milliseconds) since wavelength may not need to be tuned, such as when unassigned wavelengths are used. Spine node 108 and 122 may be the only components needed to detect that there is connectivity disruption and address the connectivity disruption with routing path 128. The example techniques may be extended to more than two data centers on optical transport ring 102 to improve resilience.

Accordingly, in accordance with techniques described in this disclosure, in a distributed data center system in which a first set of leaf network devices of a first data center (e.g., leaf nodes 106 of data center 101A) communicate with a second set of leaf network devices of a second data center (e.g., leaf nodes 120 of data center 101B) via a single one of a first spine network device (e.g., spine node 108 of the first data center or a second spine network device (e.g., spine node 122) of the second data center, spine node 108 and/or spine node 122 may determine that connectivity, through a first path (e.g., path 116B) of an optical transport ring 102, between the first spine network device (e.g., spine node 108) of the first data center and at least one leaf network device (e.g., leaf nodes 120B and 120D) of the second set of leaf network devices of the second data center is disrupted, wherein the first spine network device of the first data center provides a first routing path for packets to the at least one leaf network device of the second data center prior to disruption (e.g., spine node 108 provides a routing path from leaf nodes 106 to leaf node 120B or 120D through path 116B), and where the first routing path in unavailable after disruption (e.g., spine node 108 cannot route traffic from leaf nodes 106 to leaf nodes 120B or 120D because path 116B is disrupted).

In response to the connectivity disruption, spine node 108 and/or spine node 122 may configure one or more packet-optical transport devices 114 of the optical transport ring 102 to establish direct connectivity between spine node 108 and spine node 122 to reroute packets to be transmitted, via the first routing path, to the at least one leaf network device of the second data center (e.g., reroute packets that were to be transmitted from spine node 108 to leaf nodes 120B and 120D). The reroute of the packets is via a second routing path 128 from the first spine network device through a second path 116A of the optical transport ring to the second spine network device, and from the second spine network device to the at least one leaf network device of the second data center. Spine node 108 may communicate the packets to the at least one leaf network device of the second data center (e.g., leaf node 120B or 120D) through the second routing path 128.

Figure 3:
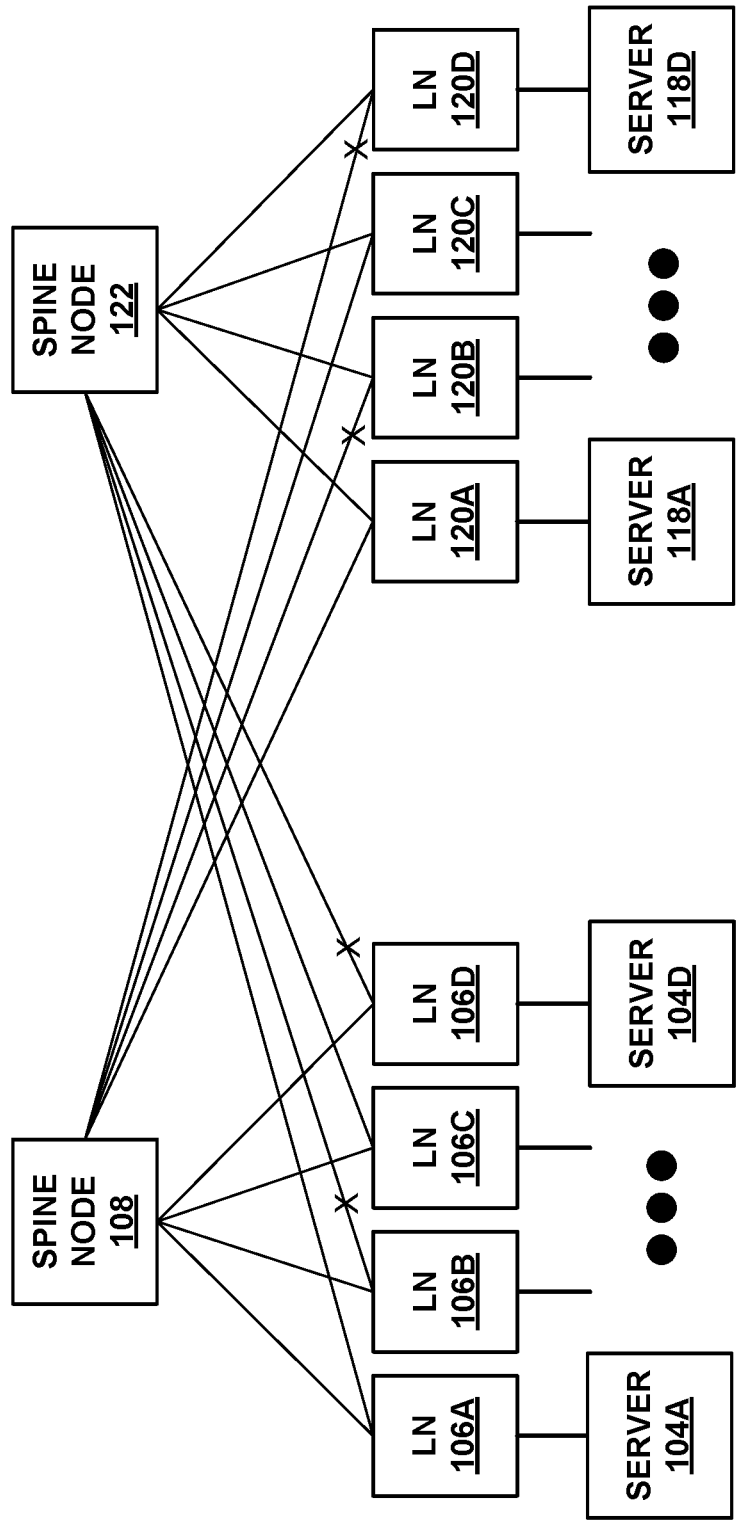
FIG. 3 is a routing view of connectivity disruption for distributed data centers.

FIG. 3 is a routing view, i.e., a logical topology view representative of the routing information for the network, upon connectivity disruption for the example distributed data center discussed above. For instance, as illustrated, spine node 108 may not be able to directly (e.g., one-hop) transmit packets to and receive packets from leaf nodes 120B and 120D, as shown with the "X." Similarly, spine node 122 may not be able to directly transmit packets to and receive packets from leaf nodes 106B and 106D, as shown with the "X." For example, servers 104B connected to leaf node 106B cannot communicate with servers 118B connected to leaf node 120B because leaf nodes 106B only has connectivity to spine node 108, but spine node 108 lost connectivity to leaf node 120B. Also, leaf node 120B has only connectivity to spine node 122, but spine node 122 lost connectivity to leaf node 106B. The same applies to sever 104B to server 118D, and server 104D to servers 118B and 118D.

Figure 4:
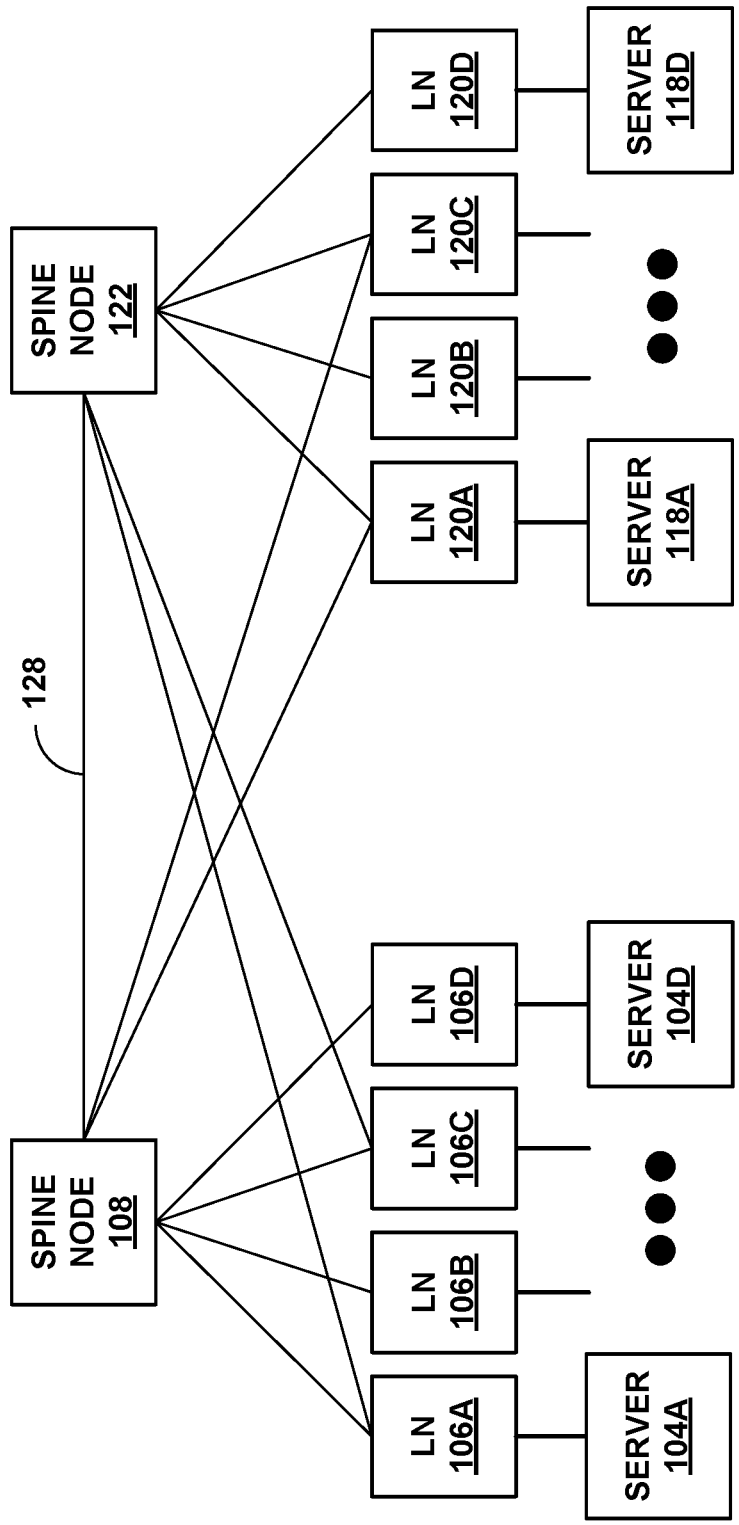
FIG. 4 is a routing view of reestablished connectivity for distributed data centers.

FIG. 4 is a routing view of reestablished connectivity for the example distributed data center when, according to the techniques described herein, the underlying optical transport system has been modified and the routing information has been updated to inject one or more inter-spine routes specifying reachability information to the affected leaf nodes. Similar to FIG. 3, in FIG. 4, spine node 108 may not be able to directly transmit packets to and receive packets from leaf nodes 120B and 120D. However, there are optically assigned wavelengths as well as updated, disaggregated routes allows spine node 108 to transmit packets to and receive packets from leaf nodes 120B and 120D via spine node 122. Also, in FIG. 4, spine node 122 may not be able to directly transmit packets to and receive packets from leaf nodes 106B and 106D. However, there is routing connection to spine node 108 that allows spine node 122 to transmit packets to and receive packets from leaf nodes 106B and 106D.

Figure 5:
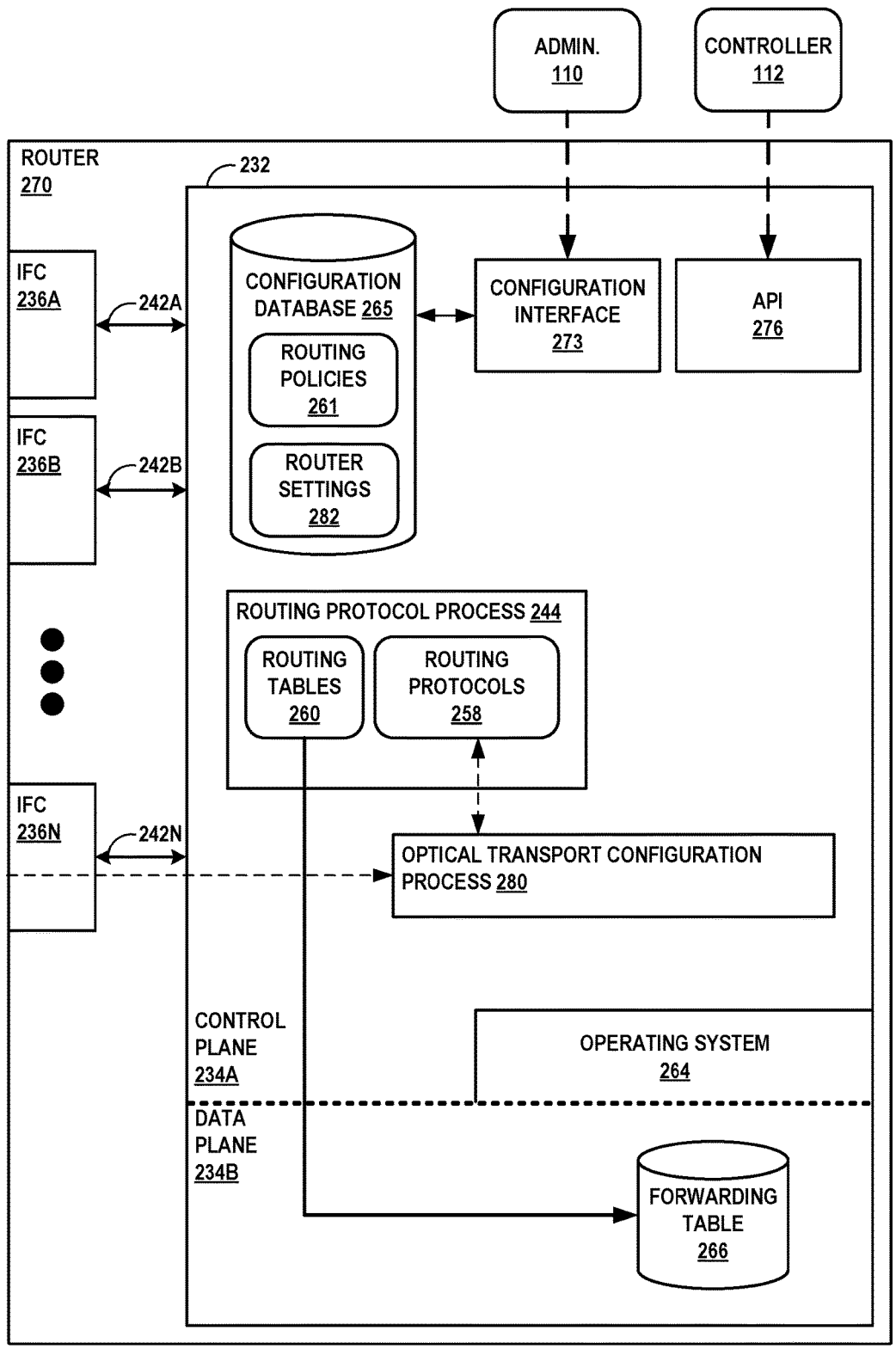
FIG. 5 is a block diagram illustrating an example of a router that implements a rerouting process, in accordance with techniques of the disclosure.

FIG. 5 is a block diagram illustrating an example of a router 270 that implements a rerouting process, in accordance with techniques of the disclosure. For purposes of illustration, example router 270 may represent an example instance of spine nodes 108 or 122 of FIGS. 1 and 2.

Router 270 includes a control unit 232 and interface cards 236A-236N ("IFCs 236") coupled to control unit 232 via internal links 242A-242N. Control unit 232 may comprise one or more processors (not shown in FIG. 5) that execute software instructions, such as those used to define one or more software or computer programs, stored to a computer-readable storage medium (not shown in FIG. 5), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, or additionally, control unit 232 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 232 is divided into two logical or physical "planes" to include a first control or routing plane 234A ("control plane 234A") and a second data or forwarding plane 234B ("data plane 234B"). That is, control unit 232 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 234A represents hardware or a combination of hardware and software of control unit 232 that define control plane functionality of router 270. Control plane 234A manages and controls the behavior of router 270, including the behavior of data plane 234B. Operating system 264 of control plane 234A provides a run-time environment for multiple different processes. Operating system 264 may represent, for example, a UNIX operating system derivative such as Linux or Berkeley Software Distribution (BSD). Operating system 264 offers libraries and drivers by which processes may interact with data plane 234B, for example, or other hardware of router 270, including a file-system, storage device(s), and main memory for router 270. Libraries and drivers of operating system 264 may include Application Programming Interfaces (APIs) that provide standard interfaces for developers to invoke the functionality of operating system 264 and router 270 exposed by the libraries and drivers.

Control plane 234A executes one or more processes. Routing protocol process 244 ("RP module 244") represents a routing protocol process that executes one or more routing protocols 258 by which at least some of the routing information stored to one or more routing tables 260 may be determined. Routing tables 260 represent a data structure for storing routing information and may represent tables, lists, trees/tries, or other data structures. A routing table may alternatively be referred to as a routing information base or may alternatively be considered a data structure within the routing information base of the router 270.

Routing tables 260 stored to a computer-readable storage device of control unit 232 (not shown in FIG. 5) may include information defining at least a portion of a network topology 258 of a network. Each of routing tables 260 may be associated with a different address family or network layer protocol, such as unicast or multicast IPv4 and IPv6, and MPLS. Any one or more of routing tables 260 may be predefined by the routing protocol process 244 or may be explicitly created by an administrator 110 using configuration interface 273 or by controller 112 using application programming interface (API) 276. Router 270 receives configuration data via the configuration interface 273 or API 276 and stores the configuration data to configuration database 265.

Configuration interface 273 is a process executing on control plane 234B that provides an interface by which administrator 110, a network operator or network management system for instance, may modify the configuration database 265 of router 270. Configuration interface 273 may present a Command Line Interface (CLI) and/or a graphical user interface (GUI) by which an administrator or other management entity may modify the configuration of router 270 using text-based commands and/or graphical interactions, respectively. In addition, or in the alterative, configuration interface 273 may present an agent that receives Simple Network Management Protocol (SNMP), Border Gateway Protocol messages, or Netconf commands from a management device to set and retrieve configuration information in configuration database 265 for router 270.

Application programming interface (API) 276, in the illustrated example, is a communications interface by which a controller 112 may modify the configuration database 265 or modify any of routing tables 260. Controller 112 may represent a network management system, a software-defined networking (SDN) controller, and/or orchestration system. API 276 may be a HTTP-based RESTful interface using JavaScript Object Notation (JSON) or eXtensible Markup Language data objects for exchanging configuration data and routing information between the controller 112 and the router 270. API 276 may be another type of API, such as a Remote Procedure Call (RPC) based API.

Routing protocol process 244 resolves the topology defined by routing information in routing tables 260 to select and/or determine one or more active routes through the network. Routing protocol process 244 may then synchronize data plane 234B with these active routes, where data plane 234B maintains a representation of these routes as forwarding table 266 (alternatively, "forwarding information base (FIB) 266"). Routing protocol process 244 may generate forwarding table 266 in the form of a radix or other lookup tree to map packet information (e.g., header information having destination information and/or a label stack) to next hops and ultimately to interface ports of IFCs 236. The operating system 264 kernel may maintain a master copy of the forwarding table 266 and install portions of the master copy to forwarding components of data plane 234B, such as packet forwarding engines.

Forwarding or data plane 234B represents hardware or a combination of hardware and software of control unit 232 that forwards network traffic in accordance with forwarding table 266. Data plane 234B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a router 270 chassis or combination of chassis.

In accordance with techniques of this disclosure, the various routers 270 (e.g., spine nodes 108 or 122) execute an optical transport configuration process 280 in response to determining a connectivity disruption along optical transport ring 102. For example, assume that one example of spine node 108 is router 270. Routing protocol process 244, such as in examples where the routing protocol is the RIFT protocol, may determine that connectivity, through a first path of an optical transport ring, between spine node 108 in a first data center 101A and at least one leaf network device (e.g., leaf node 120) is disrupted. Spine node 108 may provide a first routing path for packets to leaf nodes 120B and 120D prior to disruption, and where the first routing path in unavailable after disruption.

In response to the connectivity disruption, optical transport configuration process 280 may configure one or more packet-optical transport devices 114 to establish direct connectivity (e.g., via routing path 128) between spine node 108 and spine node 122 to reroute packets to be transmitted, via the first routing path, to the at least one leaf network device of the second data center (e.g., from spine node 108 through path 116B to leaf nodes 120B or 120D). The reroute of the packets is via a second routing path from the first spine network device through a second path of the optical transport ring to the second spine network device, and from the second spine network device to the at least one leaf network device of the second data center (e.g., spine node 108 to spine node 122 via routing path 128, and then from spine node 122 to leaf nodes 120B or 120D). Spine node 108 may then communicate the packets to the at least one leaf network device of the second data center (e.g., leaf nodes 120B and 120D) through the second routing path.

Figure 6:
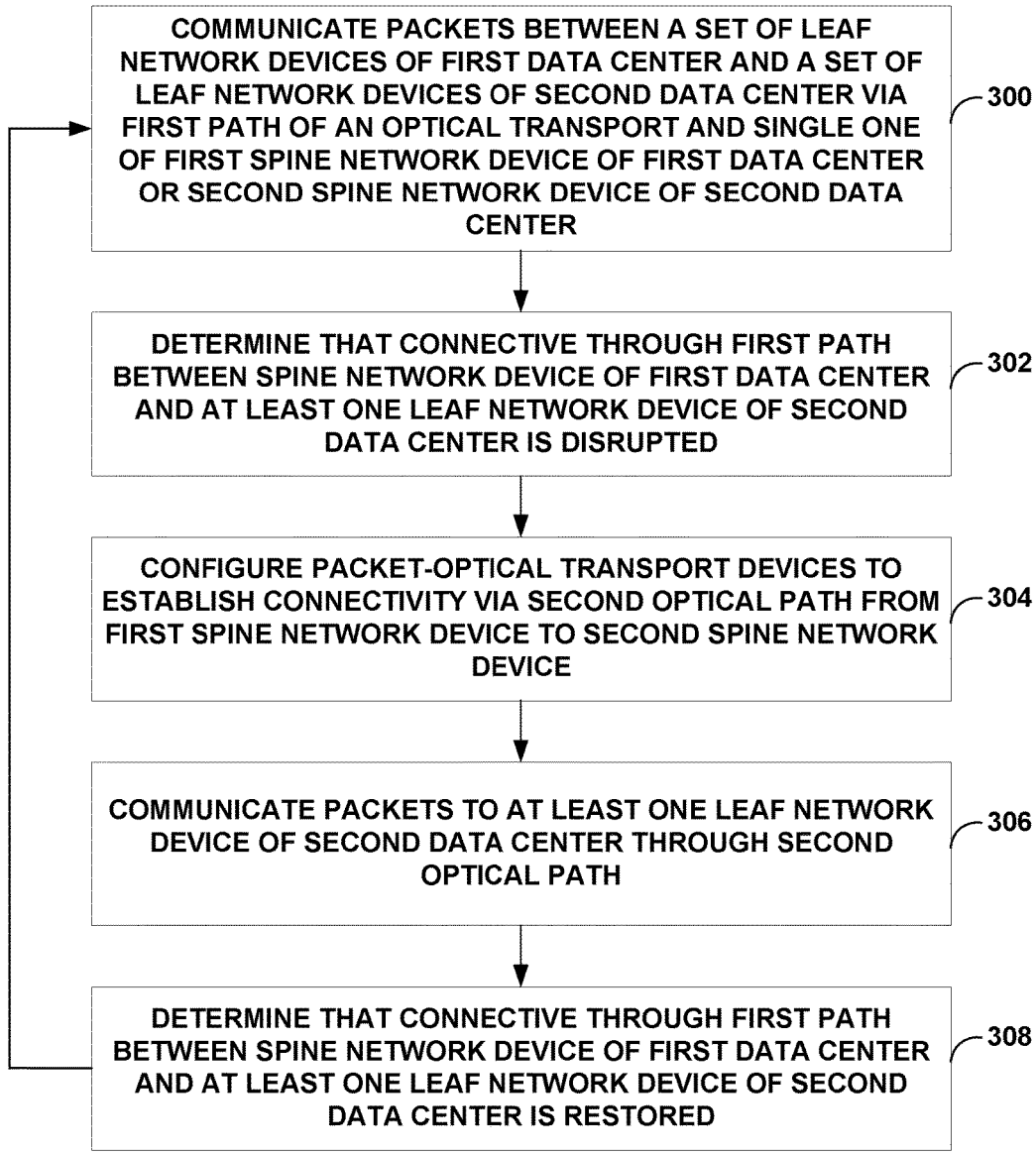
FIG. 6 is a flowchart illustrating an example method of communication between data centers in accordance with one or more techniques described in this disclosure.

FIG. 6 is a flowchart illustrating an example method of communication between data centers in accordance with one or more techniques described in this disclosure. In an initial state, in distributed data center system 100, a set of leaf network devices (e.g., leaf nodes 106) of first data center 101A communicate with a set of leaf network devices (e.g., leaf nodes 120B and 120D) of second data center 101B via a first path (e.g., optical path 116B) of optical transport ring 102 and a single one of first spine network device (e.g., spine node 108) of data center 101A, or second spine network device (e.g., spine node 122) of data center 101B (300). For example, distributed data center system 100 may operate in the manner illustrated in FIG. 1 prior to a disruption along one of the optical paths 116A or 116B. In such a distributed system, there is a single hop for leaf nodes 106 to communicate with leaf nodes 120 through spine nodes 108 or 120.

For example, leaf nodes 106 may transmit to spine node 108, which in turn transmits to leaf nodes 120, or leaf nodes 106 may transmit to spine node 122, which in turn transmits to leaf nodes 120. Optical transport ring 102 provides at least two optical paths, 116A and 116B. Optical path 116A may be configured to carry packets at a first set of wavelengths, and optical path 116B may be configured to carry packets at a second set of wavelengths, such that optical path 116A and optical path 116B each carry data from half of the leaf nodes 106 and 120. As described, in one example, path 116A carries packets for leaf nodes 106A, 106C, 120A, and 120C, and path 116B carries packets for leaf nodes 106B, 106D, 120B, and 120D.

Processing circuitry determines that connectivity, through a first optical path (e.g., path 116B) of optical transport ring 102 between the first spine network device (e.g., spine node 108) and at least one leaf network device (e.g., at least one of leaf nodes 120) is disrupted (302). As described above, the optical path 116B is for transporting packets from spine node 108 to at least one leaf node (e.g., leaf nodes 120B and 120D) prior to disruption, and optical path 116B is unavailable after disruption. Examples of the processing circuitry include circuitry of network controller 112, spine nodes 108, spine node 122, some other processor, or any combination of circuitry from network controller 112, spine nodes 108, spine node 122, and some other processor. As one example, the processing circuitry may determine that connectivity, through optical path 116B, is disrupted based on an alarm generated by a routing protocol process of spine node 108.

In response to the connectivity disruption, the processing circuitry may configure one or more packet-optical transport devices 114 to establish direct connectivity between spine node 108 and spine node 122 (e.g., via optical path 128) to reroute packets to be transmitted, via path 116B, to the at least one leaf node 120 (304). For example, the reroute of the packets is via a second optical path (e.g., optical path 128) from spine node 108 to spine node 122. In one example, configuring packet-optical transport devices 114 includes reassigning wavelengths in optical transport ring 102, which were assigned to one or more of the first set of leaf network devices that cannot communicate with at least one of the second set of leaf network devices via the single one of the first spine network device or the second spine network device. The reassigning may include reassigning the wavelengths for communication along the second optical path. For example, the processing circuitry may reassign wavelengths for leaf nodes 106B and 106D for rerouting along optical path 128. As another example, configuring the one or more packet-optical transport devices 114 includes the processing circuitry assigning unused wavelengths in optical transport ring 102 to transmit the packets via the second optical path (e.g., optical path 128).

Moreover, to allow spine node 108 to communicate with spine node 122, the processing circuitry may reassign one or more ports of the first spine network device (e.g., spine node 108) used to transmit the packets to the at least one leaf network device of the second data center (e.g., leaf nodes 120B and 120D) via the first optical path (e.g., path 116B) to transmit the packets to the second spine network device (e.g. spine node 122) via the second optical path (e.g., optical path 128). For example, in normal operation, without disruption, spine node 118 and spine node 122 may not be able to communicate directly with one another. After disruption, the ports of spine node 108 that were used by leaf nodes 106B and 106D to transmit along optical path 116B are available to be reused as the ports to allow spine node 108 to form a light path for communicating with spine node 122 via optical path 128.

The first spine network device (e.g., spine node 108) may communicate packets to at least one leaf network device (e.g., leaf nodes 120B and 120D) through the second optical path (e.g., optical path 128) (306). Spine node 108 may communicate packets meant for leaf nodes 120B and 120D through optical path 128 until the processing circuitry determines that connective through first path (e.g., optical path 116B) is restored (308), and distributed data center system 100 goes back to operating under normal conditions such as those described in FIG. 1 prior to a disruption along optical path 116A or 116B.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
in a distributed data center system in which a first set of leaf network devices of a first data center communicate with a second set of leaf network devices of a second data center via a single one of a first spine network device of the first data center or a second spine network device of the second data center, determining that connectivity, through a first optical path of an optical transport ring, between the first spine network device of the first data center and at least one leaf network device of the second set of leaf network devices of the second data center is disrupted, wherein the optical transport ring provides the first optical path for transporting packets from the first spine network device of the first data center to the at least one leaf network device of the second data center prior to disruption, and wherein the first optical path is unavailable after disruption;
in response to the connectivity disruption, configuring one or more packet-optical transport devices of the optical transport ring to establish direct connectivity between the first spine network device and the second spine network device to reroute packets to be transmitted, via the first optical path, to the at least one leaf network device of the second data center, wherein the reroute of the packets is via a second optical path of the optical transport system from the first spine network device to the second spine network device; and
communicating, by the first spine network device of the first data center, the packets to the at least one leaf network device of the second data center through the second optical path.

2. The method of claim 1, wherein configuring the one or more packet-optical transport devices comprises reassigning wavelengths in the optical transport ring, which were assigned to one or more of the first set of leaf network devices that cannot communicate with at least one of the second set of leaf network devices via the single one of the first spine network device or the second spine network device, wherein the reassigning comprises reassigning the wavelengths for communication along the second optical path.

3. The method of claim 1, wherein configuring the one or more packet-optical transport devices comprises assigning unused wavelengths in the optical transport ring to transmit the packets via the second optical path.

4. The method of claim 1, wherein communicating the packets comprises causing the first spine network device to transmit the packets through the second optical path at a first data rate, wherein the first data rate is higher than a second data rate of the packets through the first optical path.

5. The method of claim 1, further comprising:
reassigning one or more ports of the first spine network device used to transmit the packets to the at least one leaf network device of the second data center via the first optical path to transmit the packets to the second spine network device via the second optical path.

6. The method of claim 1, further comprising:
disaggregating in a routing table of the first spine network device routing information of the at least one leaf network device of the second data center; and
advertising, by the first spine network device of the first data center to the second spine network device of the second data center, routing information including a route for reaching the at least one leaf network device of the first data center through the first spine network device.

7. The method of claim 6, wherein a routing table of the at least one leaf network device of the first data center is not modified based on the connectivity disruption.

8. The method of claim 1, wherein determining that connectivity, through the first optical path of the optical transport ring, between the first spine network device of the first data center and the at least one leaf network device of the second set of leaf network devices of the second data center is disrupted comprises determining that connectivity, through the first optical path of the optical transport ring, between the first spine network device and the at least one leaf network device of the second set of leaf network devices of the second data center is disrupted based on an alarm generated by a routing protocol process of the first spine network device.

9. The method of claim 1,
wherein determining that connectivity, through the first optical path of the optical transport ring, between the first spine network device of the first data center and the at least one leaf network device of the second set of leaf network devices of the second data center is disrupted comprises determining, with the first spine network device, that connectivity, through the first optical path of the optical transport ring, between the first spine network device of the first data center and the at least one leaf network device of the second set of leaf network devices of the second data center is disrupted, and
wherein configuring the one or more packet-optical transport devices of the optical transport ring comprises configuring, with the first spine network device, the one or more packet-optical transport devices of the optical transport ring.

10. A distributed data center system comprising:
a first spine network device in a first data center having a first set of leaf network devices;
a second spine network device in a second data center having a second set of leaf network devices;
an optical transport ring having a first optical path, wherein, in the distributed data center system, the first set of leaf network devices of the first data center communicate with the second set of leaf network devices of the second data center via a single one of the first spine network device of the first data center or the second spine network device of the second data center, and wherein the first optical path is for transporting packets from the first spine network device of the first data center to the at least one leaf network device of the second data center prior to a disruption along the first optical path;
one or more packet-optical transport devices that interconnect the optical transport ring to the first and second spine network devices and the first and second set of leaf network devices; and
processing circuitry configured to:

determine that connectivity, through the first optical path of an optical transport ring, between the first spine network device of the first data center and at least one leaf network device of the second set of leaf network devices of the second data center is disrupted, wherein the first optical path is unavailable after disruption;

in response to the connectivity disruption, configure one or more of the packet-optical transport devices of the optical transport ring to establish direct connectivity between the first spine network device and the second spine network device to reroute packets to be transmitted, via the first optical path, to the at least one leaf network device of the second data center, wherein the reroute of the packets is via a second optical path of the optical transport system from the first spine network device to the second spine network device; and cause the first spine network device to communicate the packets to the at least one leaf network device of the second data center through the second optical path.

11. The system of claim 10, wherein to configure the one or more packet-optical transport devices, the processing circuitry is configured to reassign wavelengths in the optical transport ring, which were assigned to one or more of the first set of leaf network devices that cannot communicate with at least one of the second set of leaf network devices via the single one of the first spine network device or the second spine network device, wherein to reassign, the processing circuitry is configured to reassign the wavelengths for communication along the second optical path.

12. The system of claim 10, wherein to configure the one or more packet-optical transport devices, the processing circuitry is configured to assign unused wavelengths in the optical transport ring to transmit the packets via the second optical path.

13. The system of claim 10, wherein the processing circuitry is configured to cause the first spine network device to transmit the packets through the second optical path at a first data rate, wherein the first data rate is higher than a second data rate of the packets through the first optical path.

14. The system of claim 10, wherein the processing circuitry is configured to:
disaggregate in a routing table of the first spine network device routing information of the at least one leaf network device of the second data center; and
advertise, to the second spine network device of the second data center, routing information including a route for reaching the at least one leaf network device of the first data center through the first spine network device.

15. The system of claim 10, wherein to determine that connectivity, through the first optical path of the optical transport ring, between the first spine network device of the first data center and the at least one leaf network device of the second set of leaf network devices of the second data center is disrupted, the processing circuitry is configured to determine that connectivity, through the first optical path of the optical transport ring, between the first spine network device and the at least one leaf network device of the second set of leaf network devices of the second data center is disrupted based on an alarm generated by a routing protocol process of the first spine network device.

16. The system of claim 10, wherein the first spine network device comprises the processing circuitry to:
determine that connectivity, through the first optical path of the optical transport ring, between the first spine network device of the first data center and the at least one leaf network device of the second set of leaf network devices of the second data center is disrupted; and
configure the one or more packet-optical transport devices of the optical transport ring.

17. A non-transitory computer-readable storage medium storing instructions that when executed cause one or more processors to:
in a distributed data center system in which a first set of leaf network devices of a first data center communicate with a second set of leaf network devices of a second data center via a single one of a first spine network device of the first data center or a second spine network device of the second data center, determine that connectivity, through a first optical path of an optical transport ring, between the first spine network device of the first data center and at least one leaf network device of the second set of leaf network devices of the second data center is disrupted, wherein the optical transport ring provides the first optical path for transporting packets from the first spine network device of the first data center to the at least one leaf network device of the second data center prior to disruption, and wherein the first optical path is unavailable after disruption;

in response to the connectivity disruption, configure one or more packet-optical transport devices of the optical transport ring to establish direct connectivity between the first spine network device and the second spine network device to reroute packets to be transmitted, via the first optical path, to the at least one leaf network device of the second data center, wherein the reroute of the packets is via a second optical path of the optical transport system from the first spine network device to the second spine network device; and communicate, by the first spine network device of the first data center, the packets to the at least one leaf network device of the second data center through the second optical path.

18. The non-transitory computer-readable storage medium of claim 17, wherein the instructions that cause the one or more processors to configure the one or more packet-optical transport devices comprise instructions that cause the one or more processors to assign unused wavelengths in the optical transport ring to transmit the packets via the second optical path.

19. The non-transitory computer-readable storage medium of claim 17, wherein the instructions that cause the one or more processors to communicate the packets comprise instructions that cause the first spine network device to transmit the packets through the second optical path at a first data rate, wherein the first data rate is higher than a second data rate of the packets through the first optical path.

20. The non-transitory computer-readable storage medium of claim 17, further comprising instructions that cause the one or more processors to:
reassign one or more ports of the first spine network device used to transmit the packets to the at least one leaf network device of the second data center via the first optical path to transmit the packets to the second spine network device via the second optical path.

* * * * *